US012345227B1

(12) United States Patent
Collins, Jr.

(10) Patent No.: US 12,345,227 B1
(45) Date of Patent: Jul. 1, 2025

(54) MODULAR VALVULAR CONDUIT UPWELLING SYSTEM

(71) Applicant: Stanton J. M. Collins, Jr., Cedar Park, TX (US)

(72) Inventor: Stanton J. M. Collins, Jr., Cedar Park, TX (US)

(*) Notice: Subject to any disclaimer, the term of this patent is extended or adjusted under 35 U.S.C. 154(b) by 738 days.

(21) Appl. No.: 17/456,512

(22) Filed: Nov. 24, 2021

Related U.S. Application Data

(60) Provisional application No. 63/120,583, filed on Dec. 2, 2020.

(51) Int. Cl.

| | |
|---|---|
| ***E02B 3/00*** | (2006.01) |
| ***E02B 1/00*** | (2006.01) |
| ***F01D 1/36*** | (2006.01) |
| ***F03B 13/14*** | (2006.01) |
| ***F03B 17/02*** | (2006.01) |

(52) U.S. Cl.
CPC ............ *F03B 13/144* (2013.01); *E02B 1/003* (2013.01); *F01D 1/36* (2013.01); *F03B 17/025* (2013.01)

(58) Field of Classification Search
CPC ........... A01G 15/00; F03G 7/05; F03B 13/44; F03B 17/025; E02B 1/003; F01D 1/36
See application file for complete search history.

(56) References Cited

U.S. PATENT DOCUMENTS 1,329,559 A 2/1920 Nikola
2,827,268 A * 3/1958 Staaf ....................... B01F 23/43 210/194
4,051,810 A * 10/1977 Breit .................... A01K 63/047 261/25

(Continued)

FOREIGN PATENT DOCUMENTS

DE 10342853 A1 4/2005
KR 20180103489 A 9/2018
WO 2011029624 A2 3/2011

OTHER PUBLICATIONS

Geoengineering Monitor, Artificial Upwelling; Geoengineering Technology Briefing; Jun. 2018, retrieved from the Internet Oct. 2, 2020, <http://www.geoengineeringmonitor.org/2018/06/artificial-upwelling/>.

Kenson, B., Wave-Powered Water Pumps Could Become a New Source of Clean Energy, Oct. 25, 2017, retrieved from the internet Oct. 7, 2020, <https://www.popularmechanics.com/science/green-tech/news/a28767/water-pumps-driven-wave-energy-clean-energy/>.

Knaus, C., Plan to Pump Cold Water on to Barrier Reef to Stop Bleaching Labelled "Band-Aid.", The Guardian. Apr. 6, 2017, retrieved from the internet Oct. 2, 2020, https://www.theguardian.com/environment/2017/apr/07/plan-cold-water-barrier-reef-stop-bleaching.

(Continued)

*Primary Examiner* — Benjamin F Fiorello
(74) *Attorney, Agent, or Firm* — Thompson Patent Law Offices PC

(57) ABSTRACT

Apparatus and associated methods relate to upwelling systems having an array of valvular conduit modules that induce upwelling in a fluid body in response to wave motion. In an illustrative example, each valvular conduit module may be formed as a unitary rigid body extending along a longitudinal axis. The array of valvular conduit modules may be supported, for example, in a substantially vertical orientation by a float module when the system is immersed in the fluid body. The array of valvular conduit modules may be, in some examples, releasably coupled together in a lateral array, a longitudinal array, or some combination thereof. Various embodiments may advantageously passively impart upward flow of the fluid in response to wave-induced vertical displacement.

19 Claims, 8 Drawing Sheets

(56) References Cited

U.S. PATENT DOCUMENTS

| | | | | | |
|---|---|---|---|---|---|
| 4,234,269 | A * | 11/1980 | Person | E21B 19/002 405/188 |
| 4,326,840 | A | 4/1982 | Hicks et al. | |
| 4,470,544 | A * | 9/1984 | Bronicki | A01G 15/00 417/331 |
| 4,597,360 | A * | 7/1986 | Johnson | A01K 63/04 119/230 |
| 5,106,230 | A * | 4/1992 | Finley | A01K 61/80 405/195.1 |
| 5,842,838 | A | 12/1998 | Berg | |
| 8,342,818 | B2 | 1/2013 | Windle | |
| 8,602,682 | B2 | 12/2013 | Resler | |
| 8,668,472 | B2 | 3/2014 | Tillotson | |
| 8,715,496 | B2 * | 5/2014 | Bowers | A01G 15/00 417/334 |
| 8,740,499 | B2 * | 6/2014 | Heavenor | E02B 1/003 405/80 |
| 10,687,481 | B2 | 6/2020 | Soloviev et al. | |
| 2007/0084768 | A1 * | 4/2007 | Barber | E02B 1/003 210/120 |
| 2008/0175728 | A1 * | 7/2008 | Kithil | F04B 17/00 417/331 |
| 2016/0168522 | A1 | 6/2016 | Krenbrink et al. | |
| 2020/0182218 | A1 | 6/2020 | Sheldon-Coulson et al. | |
| 2021/0381496 | A1 * | 12/2021 | Deiana | F03B 13/142 |

OTHER PUBLICATIONS

Machine Design.com, Wave-driven water pump has no moving parts, Jun. 9, 2011, retrieved from the internet Oct. 20, 2020, <https://www.machinedesign.com/news/article/21819089/wavedriven-water-pump-has-no-moving-parts>.

McDill, S. "Cloud Brightening" Experiment May Help Cool Great Barrier Reef. Reuters. Apr. 22, 2020, retrieved from the internet Oct. 20, 2020, <https://www.reuters.com/article/us-earth-day-reef-cooling-idUSKCN2240ZC>.

National Geographic Society, Upwelling, Feb. 8, 2011, retrieved from the internet Oct. 2, 2020 <http://www.nationalgeographic.org/encyclopedia/upwelling/>.

Pan, Y.; Fan, W.; Zhang, D.; Chen, J.; Huang, H.; Liu, S.; Jiang, Z.; Di, Y.; Tong, M.; Chen, Y. Research Progress in Artificial Upwelling and Its Potential Environmental Effects. ResearchGate. retrieved from the internet Oct. 2, 2020 <https://www.researchgate.net/publication/286529279_Research_progress_in_artificial_upwelling_and_its_potential_environmental_effects>.

Riebesell, U. Ocean artificial upwelling, retrieved from the internet Oct. 2, 2020, <https://www.geomar.de/en/research/ b2/fb2-bi/research-topics/ocean-artificial-upwelling/>.

Saving the Great Barrier Reef.Org, Marine Cloud Brightening for the Great Barrier Reef, Cooling the Reef, retrieved from the internet Oct. 2, 2020, <https://www.savingthegreatbarrierreef.org/cooling-the-reef>.

Sawall, et al, Discrete Pulses of Cooler Deep Water Can Decelerate Coral Bleaching During Thermal Stress: Implications for Artificial Upwelling During Heat Stress Events, Frontiers in Marine Science, Aug. 28, 2020, retrieved from the internet Oct. 7, 2020, <https://doi.org/10.3389/fmars.2020.00720>.

Treefinder, Gangolf, J. Ideas, retrieved from the internet Oct. 7, 2020, <http://www.treefinder.de/ideas.html>.

White, et al, An Open Ocean Trial of Controlled Upwelling Using Wave Pump Technology. J. Atmos. Oceanic Technol, 2010, 27 (2), 385-396. retrieved from the internet Oct. 2, 2020, <https://doi.org/10.1175/2009JTECHO679.1>.

Yao, et al, Numerical Studies on the Suitable Position of Artificial Upwelling in a Semi-Enclosed Bay. Water 2020, 12(1), 177, retrieved from the internet Nov. 19, 2021, <https://doi.org/10.3390/w12010177>.

* cited by examiner

MODULAR VALVULAR CONDUIT UPWELLING SYSTEM

CROSS-REFERENCE TO RELATED APPLICATIONS

This application claims the benefit of U.S. Provisional Application Ser. No. 63/120,583, titled "Modular Valvular Conduit Upwelling System," filed by Stanton J. Collins on Dec. 2, 2020.

This application incorporates the entire contents of the foregoing application(s) herein by reference.

TECHNICAL FIELD

Various embodiments relate generally to upwelling in a fluid reservoir.

BACKGROUND

Fluid may be collected into various bodies of varying size. For example, water may be stored in man-made and natural reservoirs such as oceans, seas, lakes, rivers, ponds, and man-made containers. Fluid bodies may, for example, provide fluid storage (e.g., water storage), transportation, energy sources, food, and water sources. Fluid bodies may influence local, regional, and global weather and climate.

Fluid bodies may have attributes which vary according to a depth from a surface of the fluid body. For example, sunlight, temperature, nutrient content, mineral content, oxygen levels, and other physical attributes may vary according to a depth from the surface. Hurricanes, for example, may be affected according to surface temperature of water. Coral bleaching may be affected according to surface temperature of water. Aquatic creatures may be restricted to certain depths by, for example, sunlight and oxygen needs, but necessary nutrients or food sources may exist more abundantly at different depths.

Turbulence may be induced in fluid bodies by various forcing functions such as, for example, wind, motion of bodies in the water (e.g., living creatures, turbines, boats), relative gravitational attractions of celestial bodies (e.g., the moon), or some combination thereof. For example, natural upwelling may occur when fluid is moved from a lower surface to an upper surface by, for example, ocean currents.

SUMMARY

Apparatus and associated methods relate to upwelling systems having an array of valvular conduit modules that induce upwelling in a fluid body in response to wave motion. In an illustrative example, each valvular conduit module may be formed as a unitary rigid body extending along a longitudinal axis. The array of valvular conduit modules may be supported, for example, in a substantially vertical orientation by a float module when the system is immersed in the fluid body. The array of valvular conduit modules may be, in some examples, releasably coupled together in a lateral array, a longitudinal array, or some combination thereof. Various embodiments may advantageously passively impart upward flow of the fluid in response to wave-induced vertical displacement.

Various embodiments may achieve one or more advantages. For example, some embodiments may enable assembly of a modular valvular conduit upwelling device (MVCUD) from a plurality of pre-manufactured valvular conduit modules (VCMs). VCMs may advantageously be stored for use as-needed, and be rapidly transported, assembled into one or more MVCUDs, and deployed just-in-time. Various embodiments may advantageously eliminate all moving parts. Various embodiments may offer advantages in durability, economy, and ease of use.

In various embodiments, MVCUDs may be advantageously deployed in a fluid body to alter the surface temperature thereof by upwelling, for example, cooler fluid from a deeper level. In various embodiments, the MVCUDs may advantageously be deployed in a natural body of water to reduce storms such as, for example, hurricanes by cooling surface temperatures. In various embodiments, the MVCUDs may advantageously be deployed, for example, to mitigate coral bleaching by cooling surface temperatures. In various embodiments, the MVCUDs may be advantageously deployed to increase aquatic life populations by, for example, upwelling nutrient-rich water to a target aquatic life population.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary modular valvular conduit upwelling device (MVCUD) is introduced with reference to FIG. 1. Second, that introduction leads into a description with reference to FIGS. 2-5B of some exemplary embodiments of individual valvular conduit modules (VCMs) and VCMs assembled into MVCUDs of various dimensions. Finally, the document discusses further embodiments, exemplary applications and aspects relating to MVCUDs.

Figure 1:
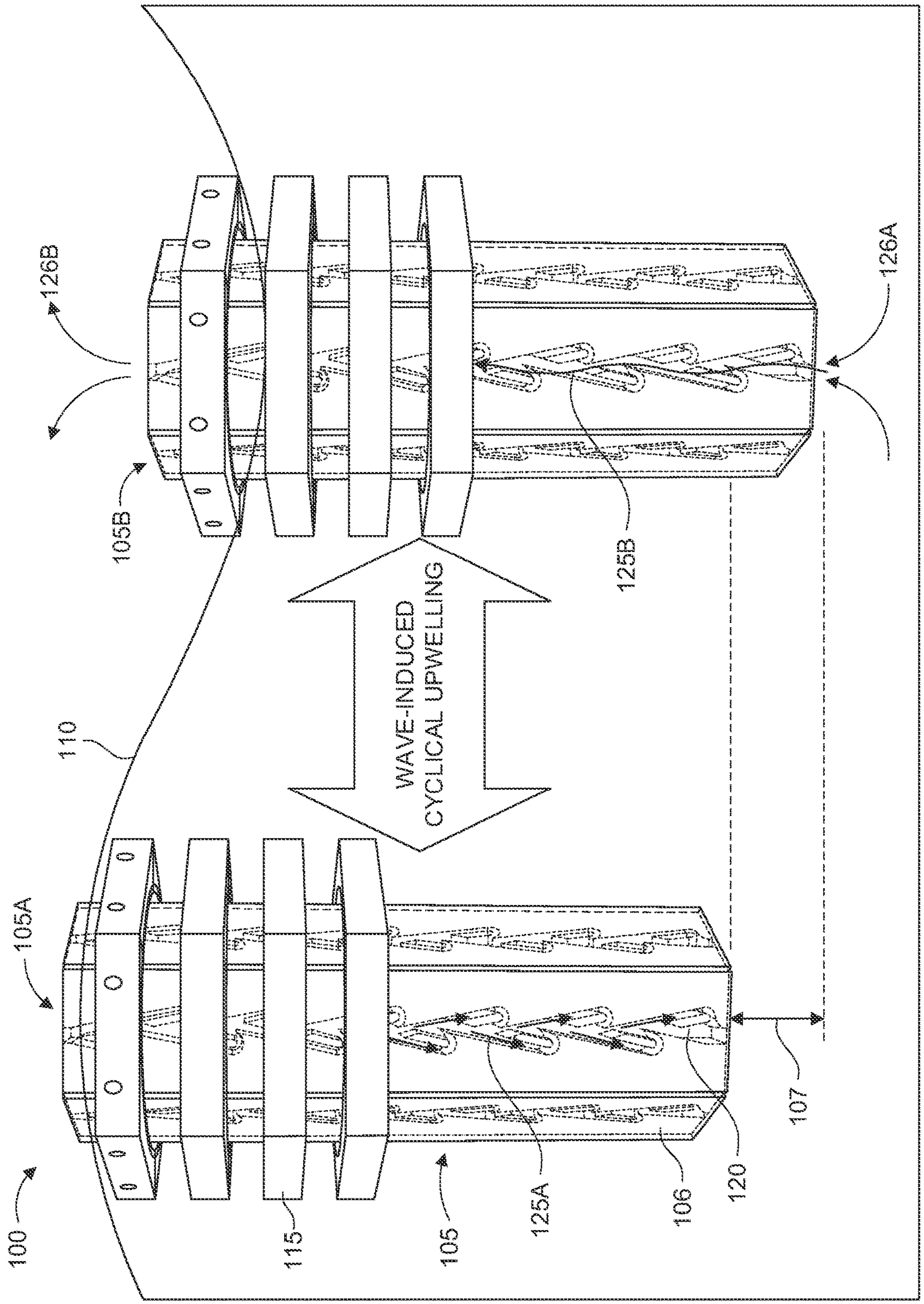
FIG. 1 depicts an exemplary passive upwelling modular valvular conduit upwelling device (MVCUD) in an illustrative use-case.

FIG. 1 depicts an exemplary passive upwelling modular valvular conduit upwelling device (MVCUD) in an illustrative use-case. In exemplary use case 100, a MVCUD 105 is immersed in a fluid body 110. The MVCUD 105 is assembled from a plurality (e.g., 6, as depicted) of VCMs 106. Each VCM 106 is formed as a unitary rigid body having at least one valvular conduit 120 formed thereinto. The VCM is configured to impart a generally one-dimensional flow when a VCM is at least partially immersed into a fluid body and reciprocated therein along its longitudinal axis. Orientation module 115 (e.g., made up of a plurality of individual flotation rings, as depicted) is releasably coupled to an upper portion of the MVCUD 105 such that the MVCUD 105 is oriented in a substantially vertical direction. As the fluid body 110 is disturbed, forming waves (as depicted in FIG. 1), the orientation module 115 causes the MVCUD 105 to substantially follow the motion of fluid body 110. Accordingly, the MVCUD 105 is caused to reciprocate vertically along its longitudinal axis between, for example, scenario 105A corresponding to a wave crest and scenario 105B corresponding to a wave trough. The MVCUD 105 is configured to passively impart upward flow of the fluid in response to wave-induced vertical displacement 107.

The induced vertical displacement from the scenario 105A to the scenario 105B forces water intake 126A into valvular conduit 120. The fluid follows a low resistance path 125B through valvular conduit 120 and is ejected 126B out the top of the VCM. As the motion of the fluid body 110 causes the MVCUD 105 to rise again (transitioning from scenario 105B to scenario 105A), the fluid attempts to flow back down; however, the geometry of the valvular conduit 120 diverts the fluid flow into a high-resistance path 125A through multiple 'pouches.' Accordingly, the fluid flow out of the valvular conduit 120 may, for example, be slowed or substantially arrested until the MVCUD 105 begins downward vertical motion again (scenario 105A to scenario 105B), thereby reversing the fluid flow and inducing further upward fluid motion. Various embodiments may, for example, advantageously induce passively impart upward flow of the fluid (of the fluid body 110) in response to wave-induced vertical displacement 107.

Figure 2:
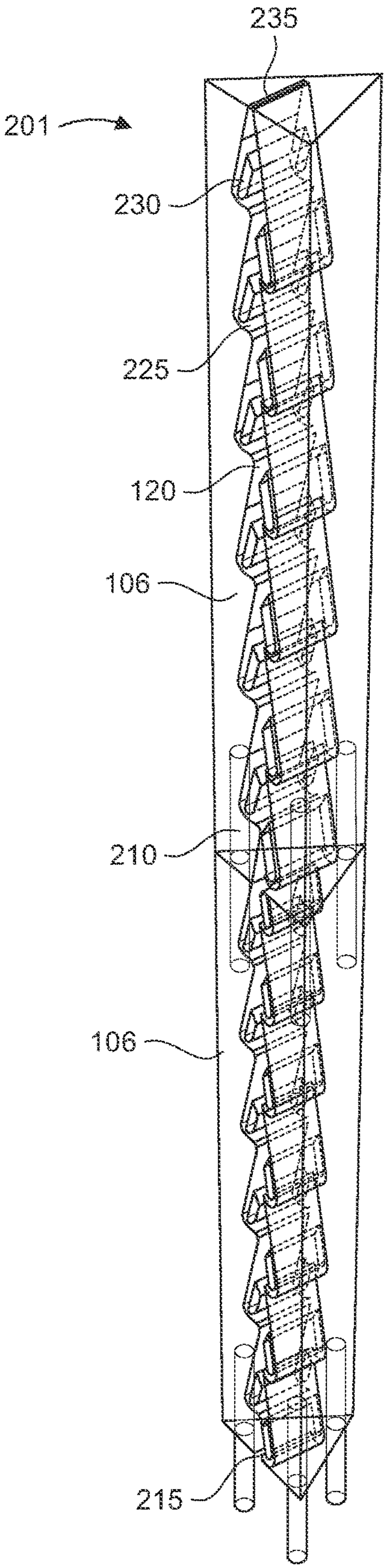
FIG. 2 depicts an exemplary connectable valvular conduit modules (VCM) of an exemplary MVCUD.

FIG. 2 depicts an exemplary connectable valvular conduit modules (VCM) of an exemplary MVCUD. The VCM 106 is formed as a unitary body having valvular conduit 120 formed therein. Fluid enters valvular conduit 120 through entry port 215 and exits through exit port 235. A plurality of high-resistance fluid paths 225 (e.g., 'loops') are formed via diverter elements 230. Fluid may advantageously follow a low-resistance path from entry port 215 to exit port 235. Furthermore, when fluid attempts to flow in the direction of the entry port 215 and away from exit port 235, the geometry of the valvular conduit may advantageously passively divert the fluid flow into the high-resistance fluid paths 225, thereby slowing or substantially arresting the retrograde fluid flow. Accordingly, the VCM may advantageously passively provide for substantially one-way flow. In some embodiments, the VCM may act as a leaky one-way valve. In various implementations, the valvular function of the VCM may, by way of example and not limitation, increase in efficacy of retrograde flow prevention as entry of fluid into entry port 215 occurs in surges of increasing frequency. Accordingly, various embodiments may advantageously increase in efficiency when immersed in a vertical orientation in more turbulent fluid bodies.

Longitudinal VCM assembly 201 is formed by releasably axially coupling two VCMs 106. VCMs 106 are connected, for example, by a plurality of coupling members 210. Each VCM 106 may be formed, as depicted, in a triangular cross-section. The triangular cross-section may, by way of example and not limitation, be an equilateral triangle. In various embodiments, VCMs may be configured to advantageously assemble in a modular fashion in three dimensions, both laterally (side by side) and longitudinally (end to end). Accordingly, MVCUDs of varying geometries, dimensions, and flow capacities may, for example, be quickly, easily, and economically assembled and deployed.

Figure 3A:
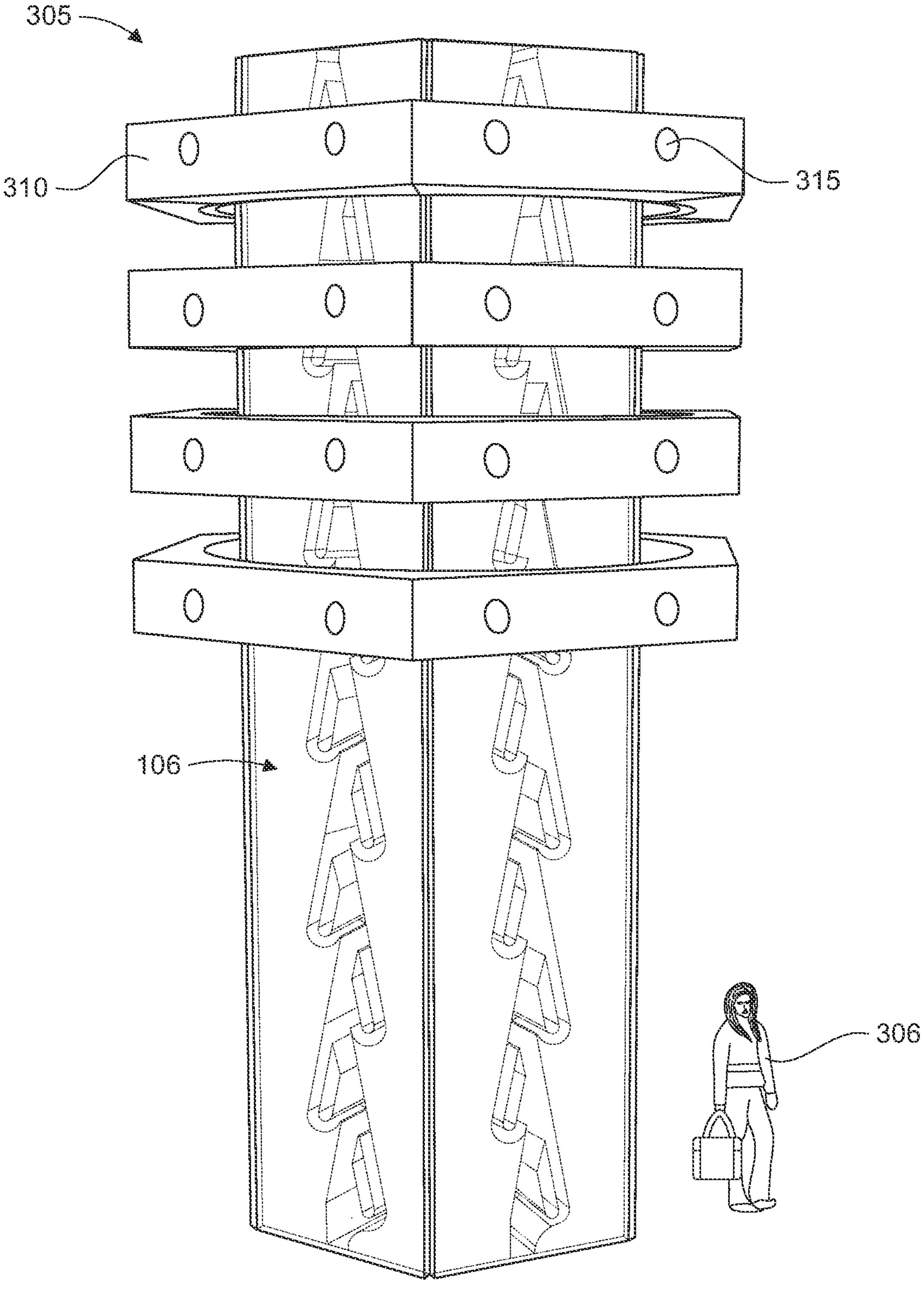
FIG. 3A depicts an exemplary MVCUD assembled of the VCMs of FIG. 2 in a two-dimensional lateral pattern.

FIG. 3A depicts an exemplary MVCUD assembled of the VCMs of FIG. 2 in a two-dimensional lateral pattern. MVCUD 305 is assembled from a plurality of VCMs 106. As depicted, six VCMs are assembled together to form a MVCUD 305 having a hexagonal cross-section. In various embodiments, other cross-sections are contemplated. Orientation module 310 is assembled from a plurality (e.g., 4) flotation rings. The flotation rings are releasably coupled to the VCMs by coupling elements 315. In various embodiments, the coupling elements 315 and the orientation module 310 may also releasably assemble the individual VCMs 106 together into MVCUD 305. In some embodiments, VCMs 106 may be releasably coupled by, for example, various mechanical coupling elements (e.g., rotational fasteners such as screws or bolts, magnets, integrated couplers, cams, fastening frame(s)). Accordingly, VCMs 106 may be assembled into a predetermined assembly MVCUD 305 having desired properties such as, by way of example and not limitation, shape, size, and/or flow capacity. By way of example and not limitation, the MVCUD 305 is depicted positioned next to an average size human 306. In various embodiments, the MVCUD 305 may be larger or smaller.

Figure 3B:
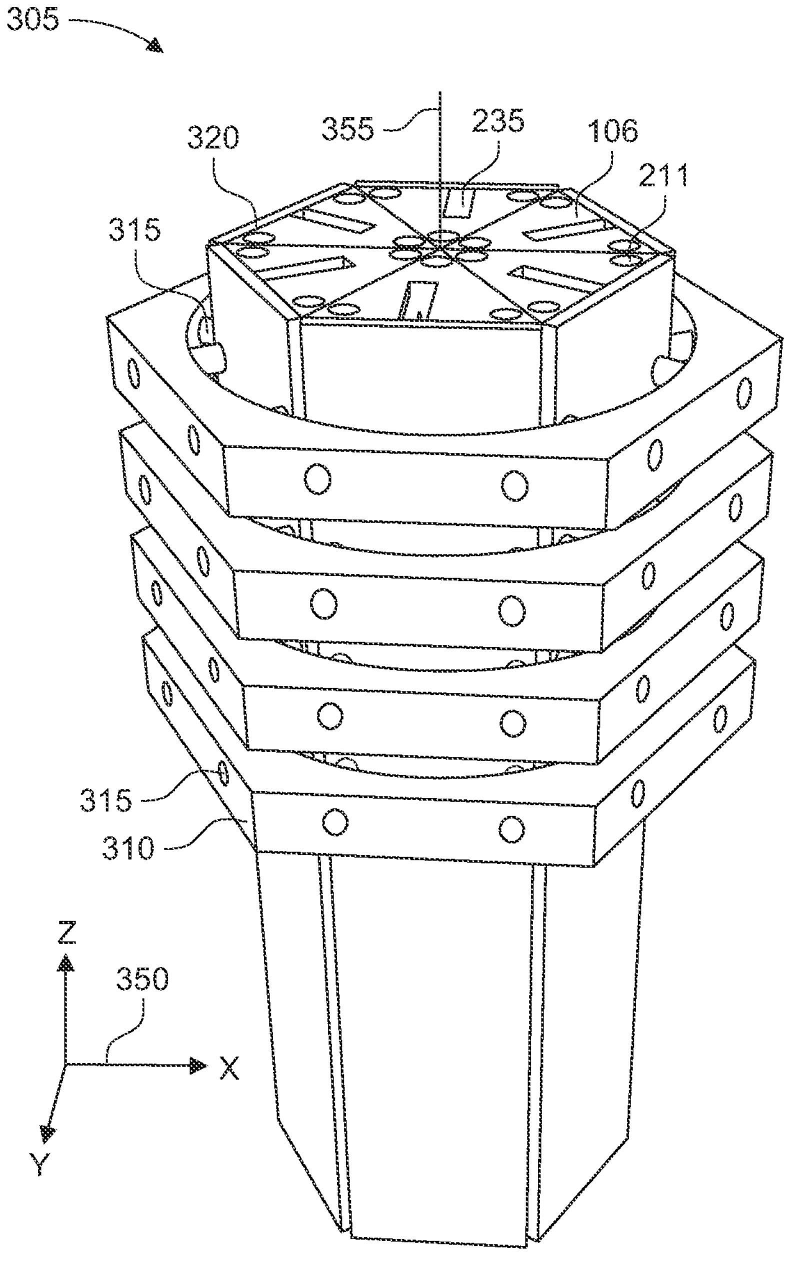
FIG. 3B depicts a top end perspective view of the exemplary MVCUD of FIG. 3A, with opaque outer walls.
Figure 3C:
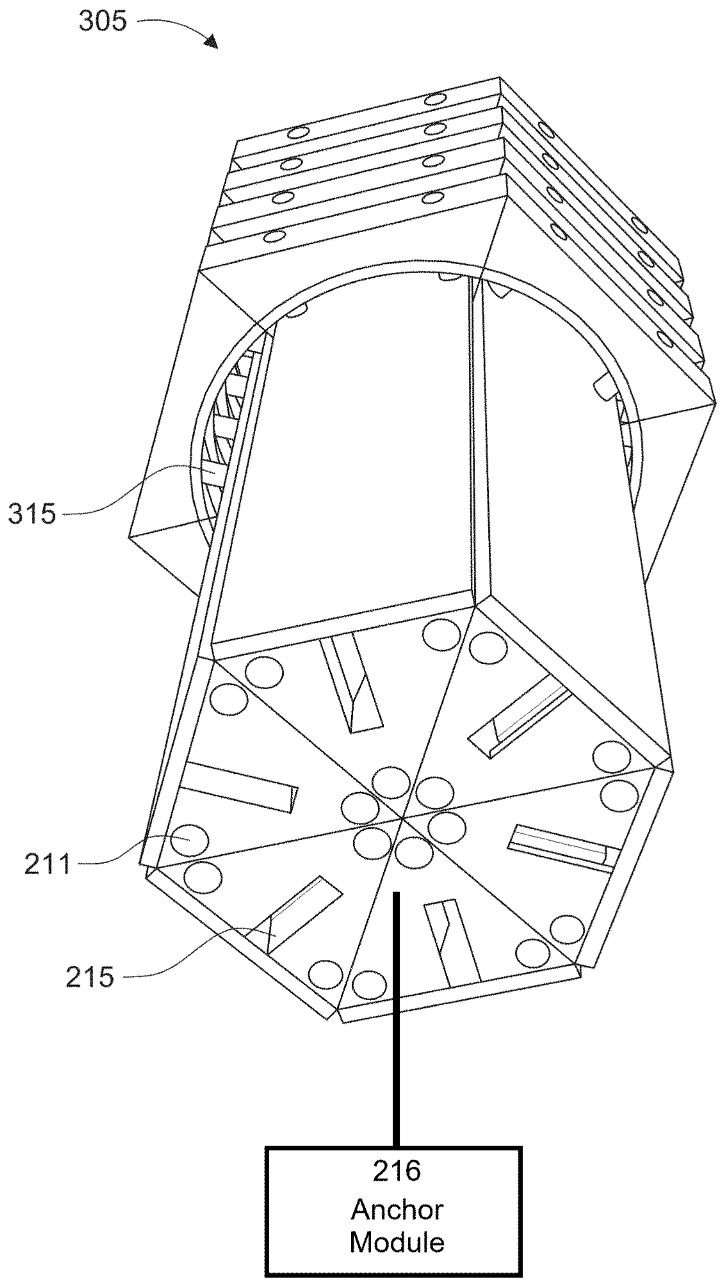
FIG. 3C depicts a bottom end perspective view of the exemplary MVCUD of FIG. 3B.

FIG. 3B depicts a top end perspective view of the exemplary MVCUD of FIG. 3A, with opaque outer walls. FIG. 3C depicts a bottom end perspective view of the exemplary MVCUD of FIG. 3B. As depicted, MVCUD 305, is assembled from six VCMs 106. The VCMs 106 are assembled laterally in two dimensions denoted as X and Y in indicative orientation axes 350. Each VCM 106 is formed as a unitary body with an exposed valvular conduit (e.g., a continuous slot-type cavity). Each VCM 106 is provided with a cover 320 configured to seal the valvular conduit 120. Once sealed by the conduit cover 320, each VCM 106 is thereby provided with at least one sealed fluid path having entry port 215 and exit port 235. The VCMs 106 may be modular coupled longitudinally (e.g., in the Z direction of axes 350) via coupling elements in coupler receptacles 211 to extend the length of the MVCUD 305 along longitudinal axis 355. Accordingly, the MVCUD 305 may be provided with a plurality of valvular conduits extending longitudinally and oriented vertically by the orientation module 310 when the MVCUD 305 is immersed in a fluid body. The MVCUD 305 may advantageously passively convert wave-driven vertical displacement into upward flow of the fluid.

Figure 4:
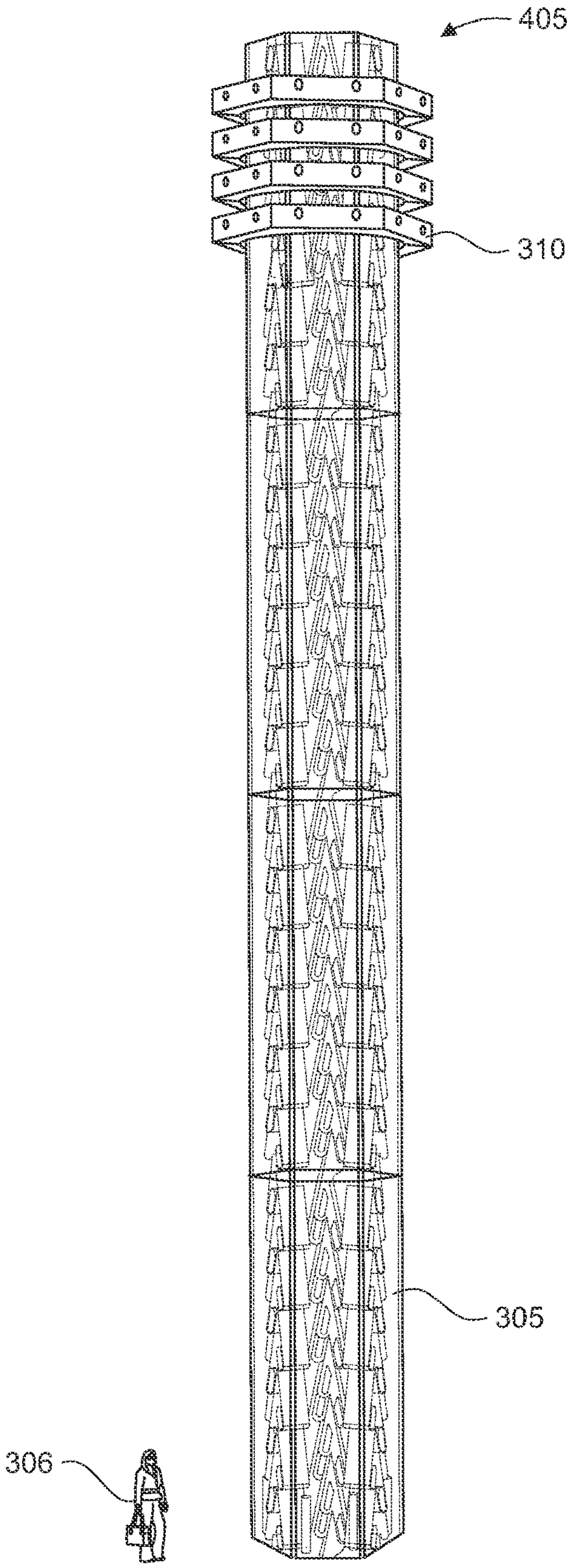
FIG. 4 depicts an exemplary extended-length MVCUD assembled of the MVCUD of FIG. 3A with longitudinal coupling of additional modules to form a three-dimensional array of VCMs.

FIG. 4 depicts an exemplary extended-length MVCUD assembled of the MVCUD of FIG. 3A with longitudinal coupling of additional modules to form a three-dimensional array of VCMs. For example, the depicted MVCUD 405 may be assembled by coupling four of the MVCUDs 305 axially along a longitudinal axis. The MVCUDs 305 may, for example, be coupled using coupling members 210 fitted into coupling receptacles 211 in abutted VCMs 106. In the depicted example, only the uppermost MVCUD 305 is provided with orientation module 310. By way of example and not limitation, the height relative to the MVCUD 305 may be seen in comparison to an average human 306. Accordingly, various embodiments may advantageously induce upwelling from a deeper level of a fluid body when MVCUD 405 is immersed therein.

Figure 5A:
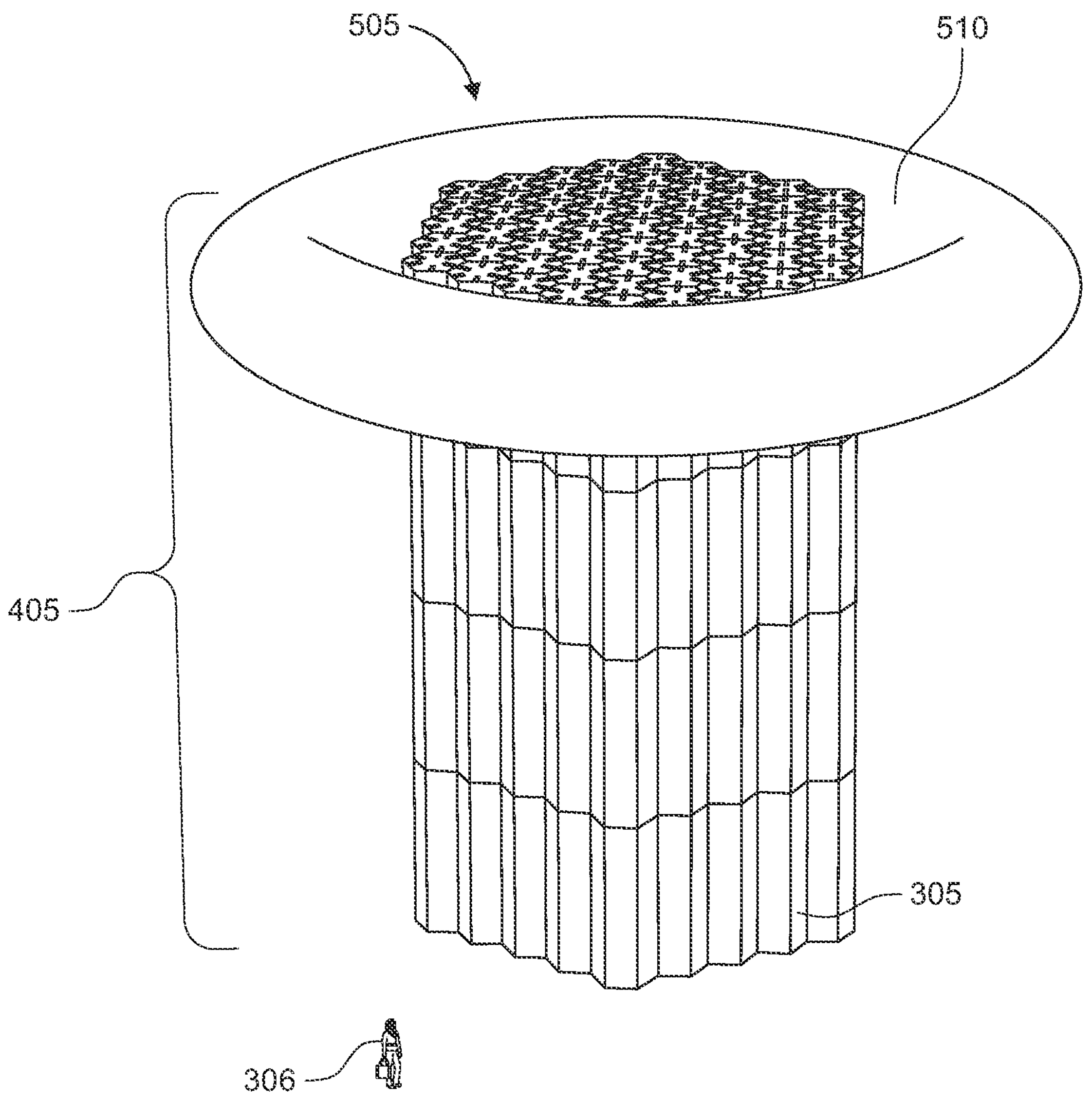
FIG. 5A depicts an exemplary mega MVCUD assembled of multiple of the exemplary MVCUD of FIG. 4 coupled laterally in a two-dimensional pattern to form an extended three-dimensional array of VCMs.

FIG. 5A depicts an exemplary mega MVCUD assembled of multiple of the exemplary MVCUD of FIG. 4 coupled laterally in a two-dimensional pattern to form an extended three-dimensional array of VCMs. The depicted MVCUD 505 is assembled laterally from a plurality of MVCUDs 405 in a honeycomb array. As discussed in relation to FIG. 4, each of the MVCUDs 405 may be formed from an axial assembly of MVCUDs 305 along a longitudinal axis. The assembled MVCUD 505 is provided with orientation module 510. The orientation module 510 may, by way of example and not limitation, be an inflatable tube, a continuous flotation device formed to surround and releasably couple to the array of MVCUDs 405. Accordingly, a three-dimensional array of VCMs may be assembled into a desired configuration to advantageously induce upwelling from a predetermined depth level in the fluid body with a predetermined flow capacity.

Figure 5B:
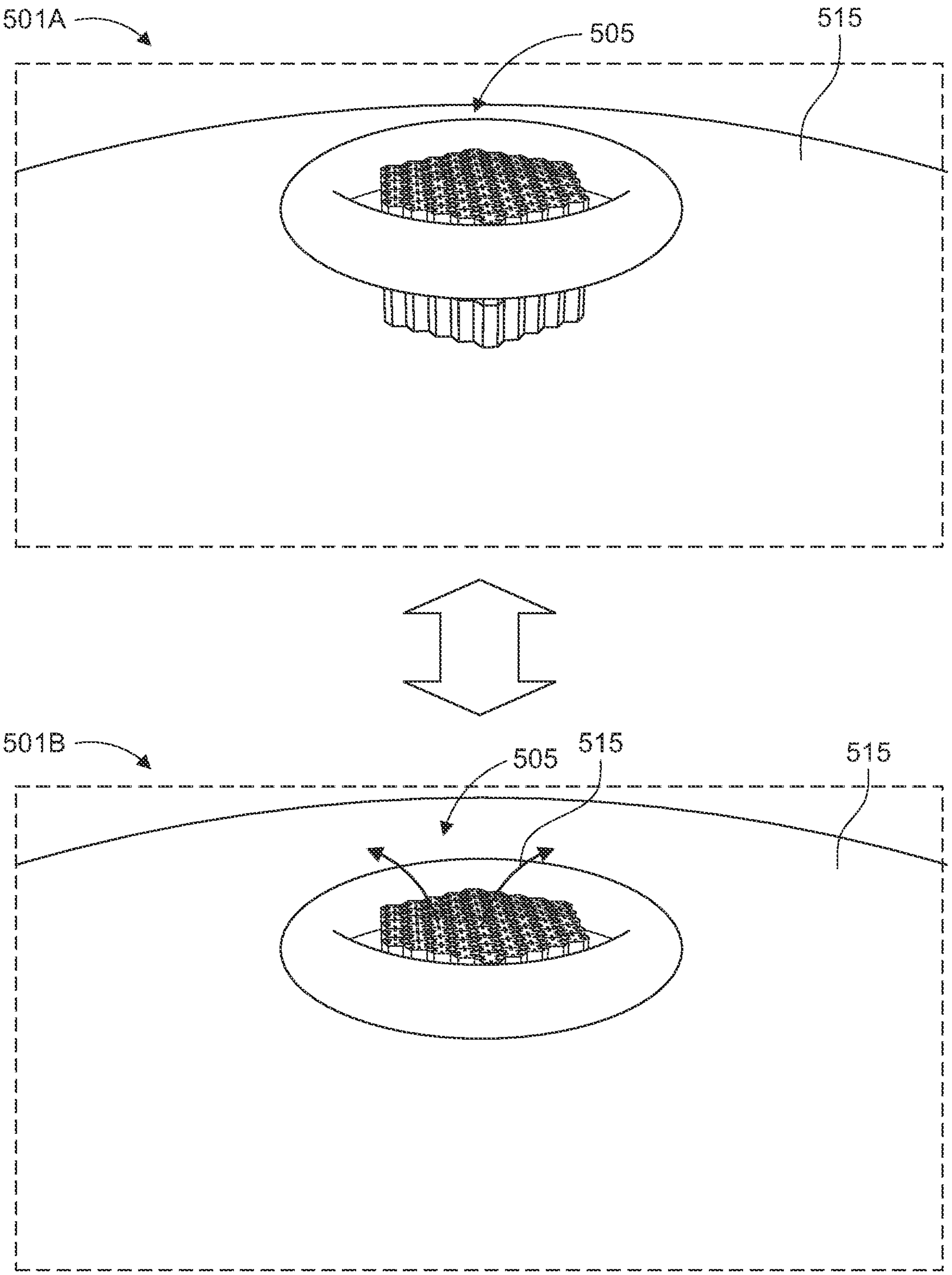
FIG. 5B depicts the exemplary mega MVCUD of FIG. 5A in an exemplary use case.

FIG. 5B depicts the exemplary mega MVCUD of FIG. 5A in an exemplary use case. A body of fluid 515 may, by way of example and not limitation, be an ocean, gulf, lake, sea, reservoir, or other fluid body. As the body of fluid 515 surges, the MVCUD 505 is cyclically vertically displaced. As depicted, for example, the fluid level drops as shown in scenario 501A, the MVCUD 505 may be relatively higher. Accordingly, the MVCUD 505 may drop down back into the body of fluid 515 as shown in scenario 501B. The downward displacement of the MVCUD 505 into the body of fluid 515 may cause fluid to enter a bottom of the MVCUD 505 from a lower depth of body of fluid 515 and be 'upwelled' to the surface as the fluid 515 is ejected from the top of the MVCUD 505. Accordingly, various embodiments may advantageously cause passively induced upwelling in a fluid body.

Although various embodiments have been described with reference to the figures, other embodiments are possible. For example, in various embodiments, the valvular conduit may be implemented as a valvular conduit described in U.S. Pat. No. 1,329,559, granted Feb. 3, 1920, to Nikola Tesla, the disclosure of which is incorporated herein by reference. Various embodiments may advantageously allow flow in one direction (e.g., upwards), while hindering flow in the opposite direction. Various embodiments may have no moving parts relative to the MVCUD. Such embodiments may, for example, rely completely on movement of a fluid body relative to the MVCUD to induce upwelling due to the valvular conduits. In various embodiments, the more turbulent (or 'choppy') the flow into the valvular conduit, the more effective may be the backflow prevention of the valvular conduit(s).

In various embodiments, an array of valvular conduit modules may be suspended vertically in a body of water. Waves in the body of water may cause cyclical vertical motion (up and down motion) of the valvular-conduit array, thereby creating turbulent flow through the modules as water flows in at the bottom end and flows out the top end. The more turbulent the body of water, the more efficient the backflow prevention and the faster the cycle time of the valvular conduit array. Accordingly, the valvular conduit array may advantageously pump both more volume and more efficiently as wave action increases.

Although various embodiments discuss an orientation module as a flotation module, such as an array of flotation rings, other embodiments are contemplated. By way of example and not limitation, the orientation module may be integral to the MVCUD. For example, one or more upper VCMs may be constructed with a higher buoyance than lower VCMs. In some embodiments, each VCM may be formed with a longitudinal buoyance profile with increasing buoyance starting at the bottom and increasing upward. Accordingly, various embodiments may be provided with at least one integrated vertical buoyance profile configured to vertically orient an MVCUD in a fluid body.

The amount of water (or other fluid) moved during a period of time, for example, may be variable based on at least three parameters: (1) the predetermined geometry of each valvular conduit module (e.g., length, conduit diameter, backflow loop), (2) the array geometry (e.g., number of modules connected together laterally, number of modules connected together longitudinally), and (3) the turbulence of the body of water in which the array is suspended (e.g., amplitude and frequency/period of waves).

In various embodiments, a modular array of valvular conduits may advantageously induce upwelling in a body of water using the natural wave action of the body of water. Upwelling may, for example, cause subsurface water to be brought to and/or near the water surface. Accordingly, surface water temperature alteration may be advantageously achieved by bringing subsurface water to the surface (e.g., cooling by upwelling cooler fluid or heating by upwelling hotter fluid). For example, hurricane formations may be inhibited or suppressed by cooling surface water temperature by upwelling cooler subsurface water. Coral reef bleaching may be reduced or avoided by upwelling cooler subsurface water. Similarly, nutrient-rich (e.g., plankton-laden) subsurface water may be upwelled to increase food accessibility for various aquatic populations.

In various embodiments, one or more MVCUDs may be provided with an active mechanism to induce vertical displacement. For example, a turbine, a longitudinal wave-inducing pump, or other turbulence-inducing mechanism may, for example, be configured to induce waves in a fluid body in which one or more MVCUDs are disposed. In various embodiments, an MVCUD(s) may be fitted with a reciprocating gear and associated source of motive power configured to induce cyclical vertical displacement of the MVCUD in a fluid body. In various embodiments, a plurality of MVCUDs may be fitted with one or more reciprocating gears (e.g., powered by solar power and/or wind power) to cause counter motion of the adjacent MVCUDs (e.g., counter cyclical vertical displacement of two adjacent MVCUDs). Various such embodiments may, for example, advantageously provide upwelling in a fluid body lacking sufficient natural motion for a desired amount of upwelling.

In various embodiments, one or more VCMs may be provided with one or more entry and/or exit ports along a side of a valvular conduit channel. For example, entry ports may be provided along a front of a VCM, exit ports may be provided along a front of a VCM, or some combination thereof. In various such embodiments the VCM may advantageously allow fluid entry and/or exit at desired levels other than a top or bottom of a MVCUD. By way of example and not limitation, an MVCUD may advantageously distribute intake fluid from a range of depths, distribute fluid along a range of depths, or some combination thereof.

Various embodiments may offer advantages in durability and economy. For example, due to the complete elimination of moving parts, manufacturing efficiencies may be realized. Similarly, due the complete elimination of moving parts, durability in notoriously rigorous environments such as the ocean may be significantly enhanced. Various embodiments may offer advantages in speed of deployment (e.g., to suppress an incoming hurricane or tropical storm) because of the modular nature of the upwelling array. Individual modules or units may be, for example, conveniently stored, transported, and assembled on site as necessary to achieve, for example, a desired depth and flow rate.

Although an exemplary system has been described with reference to the figures, other implementations may be deployed in other industrial, scientific, medical, commercial, and/or residential applications.

Various embodiments may be provided with (active) control elements. For example, in some embodiments, fluid flow through an inlet and/or outlet of a VCM may, for example, be controlled by a valve. In some embodiments, the valve may be controlled by an actuator. The actuator may, for example, be operated in response to a control signal from a controller. In some embodiments the controller may generate the control signal in response to an input receive via an input interface (e.g., from a human).

As an illustrative example, an MVCUD may, for example, be provided with one or more bypass valves. The bypass valves may divert fluid from a valvular conduit before the fluid exits an outlet. The bypass valve(s) may, for example, be operated to control a volume of upwelling (e.g., based on predetermined criterion).

In some embodiments, an MVCUD may be provided with one or more manifolds. For example, a manifold may be in fluid communication with multiple inlets and/or outlets of VCMs. The manifold(s) may, for example, provide directional control of intake and/or output of fluid for the corresponding VCMs.

In some embodiments, a controller may, for example, generate control signal(s) in response to input signal(s) from one or more sensors. For example, a sensor may measure a temperature. As an illustrative example, a first sensor(s) may be disposed at and/or near a distal end (e.g., deeper in a fluid body) of a MVCUD. A second sensor(s) may be disposed at and/or near a proximal end (e.g., nearer the surface of the fluid body) of the MVCUD. A controller may be provided with a temperature criterion. The temperature criterion may, for example, be predetermined. The temperature criterion may be dynamically determined (e.g., based on weather). In some embodiments the temperature criterion may include a minimum surface temperature (e.g., corresponding to the second sensor(s)). In some embodiments the temperature criterion may include a maximum difference between the temperature measured by the first sensor(s) and the temperature measured by the second sensor(s).

In some embodiments, a sensor may include a nutrient sensor. For example, a sensor may detect analytes corresponding to a nutrient(s) of interest. In some embodiments, a sensor may detect turbidity of water. A sensor may, for example, detect suspended particles in water. The controller may generate control signal(s) in response to the nutrient sensor(s) (e.g., at a distal end, at a proximal end) based on a (predetermined) nutrient criterion.

Sensors may, in various embodiments, include position sensors (e.g., response to positioning satellites). Some embodiments may include motion sensors (e.g., wave sensors, velocity sensors).

Some embodiments may, for example, include a communication interface. For example, the communication interface may generate, transmit, and/or receive messages between the controller and other controllers and/or humans. Some embodiments may, for example, (automatically) form a network of MVCUDs. The network may, for example, be formed based on (predetermined) criterion (e.g., proximity, location). In some embodiments, the controller(s) of the networked MVCUDs may, for example, control flow generated by the MVCUDs in response to weather data (e.g., approaching hurricanes, weather patterns corresponding to hurricanes).

Various embodiments may transmit messages (e.g., corresponding to weather, temperature, nutrient, water attributes) to a remote controller and/or data store. A display(s) may be generated based on the messages transmitted.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, an upwelling system may include a first array of valvular conduit modules. Each of the valvular conduit modules may be formed as a unitary rigid body extending along a longitudinal axis. Each of the valvular conduit modules may include an inlet at a first end and an outlet at a second end. The upwelling system may include a flotation module coupled to the first array such that each of the valvular conduit modules is oriented in a substantially vertical orientation when the first array is immersed in a fluid body. When the first array is immersed in the fluid body, the valvular conduit modules may passively impart upward flow of the fluid in response to wave-induced vertical displacement.

Each of the valvular conduit modules may have a polygonal cross-section in a plane orthogonal to the longitudinal axis.

The upwelling system may include a second array of valvular conduit modules coupled to an end of the first array, each valvular conduit module of the second array being in fluid communication with a corresponding valvular conduit module of the first array.

The upwelling system may include a second array of valvular conduit modules, each oriented substantially parallel to the longitudinal axis, and coupled to the first array such that the second array is adjacent to the first array in a substantially orthogonal direction to the longitudinal axis.

In an illustrative aspect, an upwelling system may include: a first array of valvular conduit modules, each of the valvular conduit modules: being formed as a unitary rigid body extending along a longitudinal axis, and, including an inlet at a first end and an outlet at a second end; and, an orientation module coupled to at least one valvular conduit module of the first array such that the first array is substantially maintained in a predetermined orientation range when immersed in a fluid body, wherein, when the first array is immersed in the fluid body, the valvular conduit modules passively impart net flow of the fluid in a direction substantially parallel to the longitudinal axis in response to displacement of the first array induced by motion of the fluid.

The orientation module may be external to the valvular conduit modules. The orientation module may include at least one of the valvular conduit modules. The at least one of the valvular conduit modules may include: a first region having a first density; and, a second region, separated from the first region relative to the longitudinal axis, having a second density greater than the first density.

Each of the valvular conduit modules may have a polygonal cross-section in a plane orthogonal to the longitudinal axis. The first array may be reflectively symmetrical about at least two planes parallel to the longitudinal axis.

The upwelling system may include a second array of valvular conduit modules coupled to an end of the first array, each valvular conduit module of the second array being in fluid communication with a corresponding valvular conduit module of the first array.

The upwelling system may include a second array of valvular conduit modules, each oriented substantially parallel to the longitudinal axis, and coupled to the first array such that the second array is adjacent to the first array in a substantially orthogonal direction to the longitudinal axis.

The fluid body may be a natural water reservoir. The natural water reservoir may include a sea.

The orientation module and the first array of valvular conduit modules may be configured to induce fluid flow between a first region of the fluid body below a temperature threshold and a second region of the fluid body above the temperature threshold. The orientation module and the first array of valvular conduit modules may be configured to induce fluid flow between a first region of the fluid body above a nutrient density threshold and a second region of the fluid body below the nutrient density threshold.

The upwelling system may include an anchor module 216 coupled to the first array of valvular conduit modules.

The predetermined orientation range may correspond to the longitudinal axis being substantially vertical.

Each of the valvular conduit modules may include a first fluid path between the inlet and the outlet, wherein the displacement of the first array in a first direction urges the fluid to flow through the first fluid path. Each of the valvular conduit modules may further include a second fluid path having a resistance to flow greater than the first fluid path, wherein the displacement of the first array in a second direction, substantially opposite to the first direction, urges the fluid to flow through the second fluid path.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An upwelling system comprising:
- a first array of valvular conduit modules, each of the valvular conduit modules:
  - being formed as a unitary rigid body extending along a longitudinal axis, and, comprising an inlet at a first end and an outlet at a second end; and,
- a flotation module coupled to the first array such that each of the valvular conduit modules is oriented in a substantially vertical orientation when the first array is immersed in a fluid body,
- wherein, when the first array is immersed in the fluid body, the valvular conduit modules passively impart upward flow of the fluid in response to wave-induced vertical displacement.

2. The upwelling system of claim 1, wherein each of the valvular conduit modules have a polygonal cross-section in a plane orthogonal to the longitudinal axis.

3. The upwelling system of claim 1, further comprising a second array of valvular conduit modules coupled to an end of the first array, each valvular conduit module of the second array being in fluid communication with a corresponding valvular conduit module of the first array.

4. The upwelling system of claim 1, further comprising a second array of valvular conduit modules, each oriented substantially parallel to the longitudinal axis, and coupled to the first array such that the second array is adjacent to the first array in a substantially orthogonal direction to the longitudinal axis.

5. An upwelling system comprising:
- a first array of valvular conduit modules, each of the valvular conduit modules:
  - being formed as a unitary rigid body extending along a longitudinal axis, and, comprising an inlet at a first end and an outlet at a second end; and,
- an orientation module coupled to at least one valvular conduit module of the first array such that the first array is substantially maintained in a predetermined orientation range when immersed in a fluid body,
- wherein, when the first array is immersed in the fluid body, the valvular conduit modules passively impart net flow of the fluid in a direction substantially parallel to the longitudinal axis in response to displacement of the first array induced by motion of the fluid.

6. The upwelling system of claim 5, wherein the orientation module is external to the valvular conduit modules.

7. The upwelling system of claim 5, wherein the orientation module comprises at least one of the valvular conduit modules, the at least one of the valvular conduit modules comprising:
- a first region having a first density; and,
- a second region, separated from the first region relative to the longitudinal axis, having a second density greater than the first density.

8. The upwelling system of claim 5, wherein each of the valvular conduit modules have a polygonal cross-section in a plane orthogonal to the longitudinal axis.

9. The upwelling system of claim 5, wherein the first array is reflectively symmetrical about at least two planes parallel to the longitudinal axis.

10. The upwelling system of claim 5, further comprising a second array of valvular conduit modules coupled to an end of the first array, each valvular conduit module of the second array being in fluid communication with a corresponding valvular conduit module of the first array.

11. The upwelling system of claim 5, further comprising a second array of valvular conduit modules, each oriented substantially parallel to the longitudinal axis, and coupled to the first array such that the second array is adjacent to the first array in a substantially orthogonal direction to the longitudinal axis.

12. The upwelling system of claim 5, wherein the fluid body is a natural water reservoir.

13. The upwelling system of claim 12, wherein the natural water reservoir comprises a sea.

14. The upwelling system of claim 5, wherein the orientation module and the first array of valvular conduit modules are configured to induce fluid flow between a first region of the fluid body below a temperature threshold and a second region of the fluid body above the temperature threshold.

15. The upwelling system of claim 5, wherein the orientation module and the first array of valvular conduit modules are configured to induce fluid flow between a first region of the fluid body above a nutrient density threshold and a second region of the fluid body below the nutrient density threshold.

16. The upwelling system of claim 5, comprising an anchor module coupled to the first array of valvular conduit modules.

17. The upwelling system of claim 5, wherein the predetermined orientation range corresponds to the longitudinal axis being substantially vertical.

18. The upwelling system of claim 5, each of the valvular conduit modules comprising a first fluid path between the inlet and the outlet, wherein the displacement of the first array in a first direction urges the fluid to flow through the first fluid path.

19. The upwelling system of claim 18, each of the valvular conduit modules further comprising a second fluid path having a resistance to flow greater than the first fluid path, wherein the displacement of the first array in a second direction, substantially opposite to the first direction, urges the fluid to flow through the second fluid path.

* * * * *